United States Patent [19]

Demmer et al.

[11] 4,400,229

[45] Aug. 23, 1983

[54] PROCESS FOR THE PREPARATION OF PHENOLIC RESIN-CONTAINING DISPERSIONS AND THEIR USE AS ADHESIVES

[75] Inventors: Christopher G. Demmer, Cherry Hinton; Roger Francombe, Sawston; Edward W. Garnish, Saffron Walden; Derek J. R. Massy, Linton, all of England

[73] Assignee: Ciba-Geigy Corporation, Ardsley, N.Y.

[21] Appl. No.: 326,961

[22] Filed: Dec. 2, 1981

[30] Foreign Application Priority Data

Dec. 13, 1980 [GB] United Kingdom ............... 8040002

[51] Int. Cl.³ ............................................. C09J 5/02
[52] U.S. Cl. ............................... 156/307.5; 156/335; 428/524; 524/510; 524/541; 524/841; 524/843; 525/134; 525/502
[58] Field of Search .............. 428/524; 156/307.5, 156/335; 524/510, 841, 541, 843; 525/134, 502

[56] References Cited

U.S. PATENT DOCUMENTS

| | | | |
|---|---|---|---|
| 2,128,635 | 8/1938 | Church et al. | 156/307.5 |
| 2,748,046 | 5/1956 | Works et al. | 525/134 |
| 3,259,670 | 7/1966 | Weltman et al. | 428/524 |
| 3,634,307 | 1/1972 | Morton | 260/38 |
| 3,657,177 | 4/1972 | Adesko | 524/541 |
| 3,870,670 | 3/1975 | Hofel et al. | 524/510 |

FOREIGN PATENT DOCUMENTS

| | | |
|---|---|---|
| 49-128943 | 12/1974 | Japan . |
| 50-42194 | 4/1975 | Japan . |
| 52-6742 | 1/1977 | Japan . |
| 53-1391 | 1/1978 | Japan . |
| 583148 | 12/1946 | United Kingdom ............... 156/335 |
| 958119 | 5/1964 | United Kingdom . |
| 1178679 | 1/1970 | United Kingdom . |
| 1211226 | 11/1970 | United Kingdom . |
| 1263915 | 2/1972 | United Kingdom . |
| 414275 | 8/1974 | U.S.S.R. . |

OTHER PUBLICATIONS

CA, 87, 136980y, (1977).
Derwent, 54622W/33, 71445W/43, 14652A/08, 18805W/11.

*Primary Examiner*—John J. Gallagher
*Attorney, Agent, or Firm*—Luther A. R. Hall

[57] ABSTRACT

Aqueous dispersions of a phenolic resole and a thermoplastics polymeric material or a rubber, suitable for use as adhesives, are prepared by (a) dissolving a solid thermoplastics polymeric material, such as a polyvinyl acetal or a nylon polyamide, or rubber in a phenol, (b) adding a nonionic or anionic surface active agent and/or protective colloid, (c) adjusting the mixture to a pH above 7 by addition of a base, (d) adding aqueous formaldehyde solution, or a formaldehyde donor, to a molar ratio of phenol to formaldehyde within the range 1:1 to 1:3, (e) if necessary, adding water, and (f) heating the mixture to form a phenolic resole.

10 Claims, No Drawings

PROCESS FOR THE PREPARATION OF PHENOLIC RESIN-CONTAINING DISPERSIONS AND THEIR USE AS ADHESIVES

BACKGROUND OF THE INVENTION

This invention relates to a process for the preparation of aqueous dispersions containing phenolic resins and thermoplastics polymeric materials or rubbers and to their use in bonding surfaces together.

The use of liquid structural adhesives is well known. Among such adhesives are those which comprise a mixture of a thermosettable resin, such as a phenolic resole, and a thermoplastic polymeric material, such as poly(vinyl formal) or a nylon polyamide, or a natural or synthetic rubber, this mixture being dissolved or suspended in an organic solvent. These liquid adhesives are used in a variety of structural applications, for example, in the aerospace industry and in the automobile industry. There is, however, a need for structural adhesives of this type in which the organic solvent has been replaced by water, the compositions being aqueous dispersions. The use of such dispersions avoids the dangers of pollution, toxicity, and flammability which are inherent in the use of many organic solvents. There is the further advantage that spillages of aqueous dispersions where water is the continuous phase are easily removed.

However, manufacture of aqueous dispersions from a mixture of a thermosettable resin and a thermoplastics polymeric material or a rubber can often be very difficult on an industrial scale. For example, often it is necessary first to dissolve the thermoplastics polymeric material or rubber in an organic solvent and then to add it to a solution of an aqueous protective colloid and/or surfactant at a controlled rate whilst stirring rapidly and heating to remove the solvent. The resultant dispersion is then blended with the thermosettable resin which is also in the form of an aqueous dispersion. In general, such a process is only successful when very careful control is exercised over the rates at which the various operations are carried out. Also, the pH and the temperature, as well as the quality of the starting materials, are all generally critical for success. Furthermore, special highly efficient (and therefore costly) mixers are needed, as are often vacuum facilities to assist in solvent removal.

It has now been found that stable aqueous dispersions comprising a phenolic resole and a thermoplastics polymeric material or a rubber can be simply and economically prepared without the use of organic solvents or expensive processing equipment by first dissolving the thermoplastics polymeric material or rubber in the phenol, adding suitable surface active agents and/or protective colloids, water, and a source of formaldehyde, and then allowing the phenol and the formaldehyde to react under the conditions of pH, temperature, and agitation used for the manufacture of phenolic resoles.

Reaction between a phenol and formaldehyde in the presence of a thermoplastics polymeric material or a rubber is not inherently novel.

In British Patent Specification Nos. 958,119, 1,178,679, and 1,211,226 there are described adhesive emulsions that are prepared by mixing a natural or synthetic rubber latex with an aqueous solution of a phenol and formaldehyde and allowing these mixtures to react. In British Patent Specification No. 1,263,915 there is described a method of making a rubber cement composition for use in the production of reinforced rubber articles. According to that Specification, a solution or dispersion of a rubber in an organic solvent is mixed with a resin precursor in the same or a different solvent. The resin precursor may be a generator of formaldehyde and an aromatic hydroxy compound such as resorcinol or 1,3-dihydroxynaphthalene. The composition is applied to a reinforcement and dried.

In British Patent Specification No. 1,213,351 the preparation is described of friction linings from a mixture of a friction material and a phenolic resin which had itself been prepared from a mixture which contained 1 to 15% by weight of a nylon polyamide, based on the weight of the phenol. In the example given, sulfuric acid is used as catalyst for a reaction between cresol and formaldehyde in the presence of a nylon.

In an abstract of Japanese Published Application No. 77.06742 (Chemical Abstracts, Vol. 87, Abstract No. 136980y) there are described adhesives prepared from a mixture of phenol, formalin, aqueous sodium hydroxide, and poly(vinyl alcohol). The resultant polymer solution was mixed with a resorcinol-formaldehyde resin before use.

In none of these publications is there a disclosure of the preparation of a stable dispersion by reaction of a phenol, in which there is dissolved a thermoplastic polymeric material or a rubber, with formaldehyde in the presence of water and a surface active agent and/or a protective colloid.

SUMMARY OF THE INVENTION

Accordingly, this invention provides a process for the preparation of aqueous dispersions, suitable for use as adhesives, which comprises (a) dissolving a solid thermoplastics polymeric material or a solid rubber in a phenol which is in a liquid state, (b) adding at least one nonionic or anionic surface active agent and/or at least one protective colloid, (c) adjusting the resulting mixture to a pH above 7 by addition of a base, (d) adding aqueous formaldehyde solution, or a formaldehyde donor (as hereinafter defined), to a molar ratio of phenol to formaldehyde within the range 1:1 to 1:3, and preferably in the range 1:1.2 to 1:2, (e) if necessary, adding water to bring the mixture to a water content of at least 20% by weight, calculated on the weight of the phenol, and (f) heating the mixture and allowing it to react to form a phenolic resole.

Steps (a) to (e) may be carried out in any order, although it is preferred that the first step be the dissolution of the solid thermoplastic polymeric material or rubber in the phenol, as such or as a concentrated aqueous solution.

There is further provided a method of bonding surfaces together which comprises coating at least one surface with an aqueous dispersion prepared by the process of this invention, allowing or causing the dispersion to dry, bringing the surfaces into contact, and heating the assembly to cure the phenolic resole contained in the dispersion. A yet further aspect of this invention comprises articles having surfaces bonded together by this method.

DESCRIPTION OF THE PREFERRED EMBODIMENTS

The phenols used in accordance with the present invention may be any phenols conventionally used in the preparation of resoles and which are liquids below about 100° C. under the conditions used in the reaction. They may, for example, contain water or they may be used as mixtures of phenols or as mixtures of phenols and their methylolated derivatives. Typical such phenols include phenol itself, resorcinol, p-cresol, m-cresol, 2,6-xylenol, p-nonylphenol, p-tert.butylphenol, isopropylphenols, bis(p-hydroxyphenyl)methane, and 2,2-bis(p-hydroxyphenyl)propane.

By the term "formaldehyde donor", as used in the present specification and claims, is meant any material that liberates formaldehyde under the conditions of the reaction to form with the phenol a resole, such as paraformaldehyde and trioxan.

Suitable anionic surface active agents used in the present invention include alkali metal salts of aliphatic carboxylic acids of 12 to 18 carbon atoms in all, alkylbenzenesulfonic acids, naphthalenesulfonic acids, sulfated esters of long chain fatty acids, or polyoxyethylene alkylsulfuric acids. Suitable nonionic surface active agents include polyoxyalkylated alkylphenols, polyoxyalkylated alkylphenol novolaks, polyoxyalkylated fatty acids, polyoxyalkylated resinic acids, polyoxyalkylated long chain alcohols, and polyoxyalkylated castor oil. Polyoxyalkylation may be effected using an alkylene oxide such as ethylene oxide, propylene oxide, or butylene oxide, or mixtures thereof. Ethylene oxide is the preferred polyoxyalkylating agent.

Protective colloids which may be used in preparing the dispersions of this invention include synthetic materials, such as poly(vinyl alcohol) and partially hydrolysed poly(vinyl acetate), semisynthetic materials such as water-soluble cellulose ethers, especially sodium carboxymethylcellulose and methylcellulose, and natural materials such as vegetable gum, proteins, and starches, especially guar gum, algin, carrageenan, gum acacia, gum tragacanth, and amylopectin.

Condensation of the phenol and formaldehyde to form a phenolic resole is, as already mentioned, carried out under basic conditions; suitable bases which may be used include alkali metal or alkaline earth metal hydroxides, especially sodium and potassium hydroxides, ammonium hydroxide, and tertiary amines, especially triethylamine.

Provided there is at least 20% by weight calculated on the weight of the phenol, the amount of water present in the reaction mixture is not critical; there must, of course, be sufficient for the composition to be a dispersion. Preferably, however, the weight of water in the mixture is at most 400%, calculated on the weight of phenol present, water contents that are 100% to 200% of the weight of the phenol being particularly preferred.

A wide variety of thermoplastics polymeric materials or rubbers may be used; however, the material must substantially dissolve in the phenol at the reaction temperature. Suitable thermoplastics polymeric materials include poly(vinyl acetate), ethylene-vinyl acetate copolymers, acrylonitrile-butadiene-styrene copolymers, polystyrene, polysulfones, polycarbonates, polyamides, and acetals of poly(vinyl alcohol), particularly poly(vinyl butyral), poly(vinyl acetal), and especially poly(vinyl formal). These polymers normally have an average molecular weight above 10,000; those having an average molecular weight within the range 20,000 to 250,000 are especially preferred for use in the compositions of this invention. The amount of thermoplastics polymeric material or rubber in the reaction mixture is usually within the range 5% to 100% by weight, calculated on the weight of the phenol, and preferably in the range 10% to 60% by weight. Conveniently, the thermoplastics polymeric material or rubber is in finely divided form when added to the phenol.

The process may be carried out by heating at 30° C. or up to the boiling point of the mixture, which may be elevated by means of pressure. Typically, the reaction is effected at 40° to 120°, especially at 60° to 100° C. The reaction is usually substantially complete within 6 hours, although this time may vary, depending, for example, upon the selected reaction temperature.

Dispersions made according to the present invention are generally stable on storage at ambient temperatures. Samples stored at 20° C. for 6 months showed no signs of separation or other indication of instability. They may be applied to one or both surfaces to be bonded by brushing, spraying, dipping, roller coating or any other method, and are allowed to dry, either at ambient temperature or, with gentle heating, up to about 90° C. The surfaces are then brought together and the resole is cured by heating at a temperature above 100° C., usually within the range 100° to 200° C., preferably at 140° to 180° C. Cure is usually substantially complete within 2 hours, curing times of 20 minutes to 1 hour being preferred.

The compositions may be used to bond any substrates that can withstand the curing temperatures necessary. Usually, one substrate is a metal but the other can be the same or a different metal, a thermoset composite, a thermoplastics polymeric material having a high melting point, a thermoset resin, and similar materials. The compositions are particularly suitable for bonding friction linings, such as brake pads, to metal shoes.

The following Examples illustrate the invention. Unless otherwise indicated, all parts and percentages are by weight. The solids contents were determined by heating a 2 g sample in a 5 cm open dish at 120° C. for 3 hours and measuring the weight loss.

EXAMPLE 1

Industrial grade phenol (214 g; 77% $C_6H_5OH$, 23% water) and ethylcellulose (0.5 g) were stirred together at room temperature until the ethylcellulose had completely dissolved. The mixture was then heated to 50° C. and poly(vinyl formal) (66 g; average molecular weight in the range 24,000–40,000) was added portionwise over 2 hours, complete solution in the phenol being obtained. To the solution was then added 0.5 g of a surface active agent (dioctyl succinate sulfonic acid sodium salt) and the following protective colloids: gum acacia (11 g), partially hydrolysed poly(vinyl acetate) (2.8 g; degree of hydrolysis 87–89%), gum tragacanth (0.8 g), and sodium carboxymethylcellulose (3.5 g). Finally, water (34.5 g), aqueous ammonia (15.6 g; 31.1% $NH_3$), and formalin (229 g; 36.7% HCHO) were added. The mixture was stirred and heated under reflux for 1 hour, then cooled to room temperature, stirring being continued during cooling. The resultant dispersion was stable on storage at room temperature for over 6 months. It had a solids content of 47.7%.

Similar results could be obtained by replacing the poly(vinyl formal) by an equal weight of Hycar CTBN 1300X 13, an acrylonitrile-butadiene rubber obtained from Goodrich Chemical Co., Akron, Ohio, U.S.A.; PK/HH, a phenoxy resin obtained from Union Carbide UK Ltd., Rickmansworth, Herts., England; Gelva 25, a poly(vinyl acetate) obtained from Monsanto Ltd., London, England; Blendex 101, an acrylonitrile-butadiene-styrene copolymer obtained from Borg Warner Ltd., Letchworth, Herts., England; P 3500, a polysulfone obtained from Union Carbide UK Ltd., Ultramid I.C., a polyamide obtained from B.A.S.F. United Kingdom Ltd., Cheadle Hulme, Cheshire, England; Butvar B76, a poly(vinyl) butyral) obtained from Monsanto Ltd., and Vinapol 92L, a poly(vinyl alcohol) obtained from Vinyl Products Ltd., Carshalton, Surrey, England. The words "Hycar", "Gelva", "Blendex", "Ultramid", "Butvar", and "Vinapol" are all trade marks.

EXAMPLE 2

The process of Example 1 was repeated except that the surface active agent and the gum tragacanth were omitted and 12 g of gum acacia and 3 g of the partially hydrolysed poly(vinyl acetate) were used.

EXAMPLE 3

The process of Example 1 was repeated, employing 311.7 g of the same grade of phenol, 0.7 g of ethylcellulose, 74.5 g of the poly(vinyl formal), omitting the surface active agent and the gum tragacanth and using 16.8 g of gum acacia, 3.9 g of the partially hydrolysed poly(vinyl acetate), and 4.9 g of sodium carboxymethylcellulose.

EXAMPLE 4

Phenol (42 g; 100%), ethylcellulose (0.5 g) and Hycar CTBN 1300X 13 (12 g) were stirred together at 80° C. until the ethylcellulose had completely dissolved. The mixture was kept at this temperature and the following were added: partially hydrolysed poly(vinyl acetate) (2.5 g; degree of hydrolysis 87–89%), sodium carboxymethylcellulose (1.5 g), and dioctyl succinate sulfonic acid sodium salt (0.4 g). Next, water (8.6 g), aqueous ammonia (4.0 g; 31% NH$_3$), and formalin (49.3 g; 38.1% HCHO) were added. The mixture was stirred and heated under reflux for 1 hour, then cooled to room temperature, stirring being continued during cooling. The resultant dispersion was stable on storage at room temperature and had a solids content of 53.8% and a mean particle size of 4 μm.

EXAMPLE 5

Phenol (42 g; 100%) was melted and then maintained at 80° C. whilst a nylon polyamide, Ultramid I.C., (12 g) was added portionwise. Partially hydrolysed poly(vinyl acetate) (2.5 g; degree of hydrolysis 87–89%) was added to the mixture which was then cooled to room temperature. Ethylcellulose (0.5 g) was added and the mixture was stirred until the ethylcellulose had dissolved. The mixture was then heated to 50° C. and to it were added sodium carboxymethylcellulose (1.5 g) and dioctyl succinate sulfonic acid sodium salt (0.4 g). Water (8.6 g), aqueous ammonia (4.0 g; 31% NH$_3$), and formalin (49.3 g; 38.1% HCHO) were added, and the mixture was heated and then cooled as described in Example 4. The resultant dispersion was stable at room temperature and had a mean particle size of 5 μm.

EXAMPLE 6

Phenol (42 g; 100%) was melted and then maintained at 80° C. whilst ethylcellulose (0.5 g) was added. A poly(vinyl butyral) resin, Butvar B90, (4.5 g) was added portionwise to the mixture maintained at 80° C., complete solution being obtained within 30 minutes. To the solution were then added partially hydrolysed poly(vinyl acetate) (2.5 g; degree of hydrolysis 87–89%), sodium carboxymethylcellulose (1.5 g), and dioctyl succinate sulfonic acid sodium salt (0.4 g). Water (8.6 g), aqueous ammonia (4.0 g; 31% NH$_3$), and formalin (49.3 g; 38.1% HCHO) were added, and the mixture was heated and then cooled as described in Example 4. The dispersion had a solids content of 44.7% with a mean particle size of 5 μm.

EXAMPLE 7

Phenol (42 g; 100%) was melted and then maintained at 80° C. whilst ethylcellulose (0.5 g) was added. A polycarbonate resin (10.3 g) of average molecular weight 25,000, prepared from bisphenol A and phosgene, was added portionwise to the mixture maintained at 80° C., complete solution being obtained in 4 hours. To the solution were added partially hydrolysed poly(vinyl acetate) (2.5 g; degree of hydrolysis 87–89%), sodium carboxymethylcellulose (1.5 g), and dioctyl succinate sulfonic acid sodium salt (0.4 g). Next, water (8.6 g), aqueous ammonia (4.0 g; 31% NH$_3$), and formalin (49.3 g; 38.1% HCHO) were added, and the mixture was heated then cooled as in Example 4. The resultant dispersion had a solids content of 55.5% and a mean particle size of 5 μm.

EXAMPLE 8

Phenol (42 g, 100%) was melted and then maintained at 80° C. whilst ethylcellulose (0.5 g) was added. A phenoxy resin, PK/HH, (6 g) was added portionwise to the mixture maintained at 80° C., complete solution being obtained in 1½ hours. Partially hydrolysed poly(vinyl acetate) (2.5 g; degree of hydrolysis 87–89%), sodium carboxymethylcellulose (1.5 g), dioctyl succinate sulfonic acid sodium salt (0.4 g), then water (8.6 g), aqueous ammonia (4.0 g; 31% NH$_3$), and formalin (49.3 g; 38.1% HCHO) were added and the mixture was heated and then cooled as in Example 4. The dispersion had a mean particle size of 5 μm.

EXAMPLE 9 meta-Cresol (119.8 g; 100%) and ethylcellulose (1.1 g) were stirred and heated together until the ethylcellulose had completely dissolved. The temperature of the mixture had then reached 95° C. To this mixture was added poly(vinyl formal) (33.3 g; average molecular weight in the range 16,000–20,000) portionwise over 30 minutes, complete solution being obtained. Partially hydrolysed poly(vinyl acetate) (5.5 g; degree of hydrolysis 87–89%), sodium carboxymethylcellulose (3.3 g) and dioctyl succinate sulfonic acid sodium salt (1.6 g) were then added. Water (33.3 g), aqueous ammonia (7.9 g; 35% NH$_3$), and formalin (127.6 g; 36.5% HCHO) were added as in Example 4, the mixture was stirred and heated under reflux for 1 hour, and then water was added (150 g). The mixture was cooled to room temperature, stirring being continued during cooling. The dispersion had a solids content of 37% and a mean particle size of 4 μm.

EXAMPLE 10

Industrial grade phenol (206 g; 80% C$_6$H$_5$OH, 20% water) and ethylcellulose (1 g) were stirred together at room temperature until the ethylcellulose had completely dissolved. The mixture was then heated to 50° C. and poly(vinyl formal) (66 g; average molecular weight in the range 24,000-40,000) was added portionwise over 1 hour, complete solution being obtained. To the solution were added the partially hydrolysed poly(vinyl acetate) (10 g; degree of hydrolysis 87-89%), sodium carboxymethylcellulose (6 g), and dioctyl succinate sulfonic acid sodium salt (0.8 g). Next, water (34.4 g), aqueous ammonia (16.2 g; 29.7% NH₃), and formalin (197.2 g; 38.1% HCHO) were added, and the mixture was heated and then cooled as in Example 4. The dispersion had a solids content of 45.3% and a mean particle size of 2 μm.

EXAMPLE 11

The dispersion prepared as described in Example 1 was applied to degreased and gritblasted bright rolled mild steel strips 25 mm wide and 1.63 mm thick. These were allowed to dry at 85° C. for 30 minutes and then a similar steel strip was placed on top, giving a 12 mm overlap single lap joint. The joints were cured under an applied pressure of 700 kPa and their bond strengths in longitudinal shear were measured at 23° C. and at 200° C. The results are shown in Table 1, the figures being the mean of four results.

TABLE 1

| Cure temperature/time | Shear strength (kN) at | |
|---|---|---|
| | 23° C. | 200° C. |
| 150° C./30 min. | 3.48 | 0.83 |
| 150° C./60 min. | 2.36 | 1.25 |
| 180° C./30 min. | 3.35 | 1.49 |
| 180° C./60 min. | 3.18 | 1.24 |

EXAMPLE 12

Samples of commercial automobile brake linings 25 mm × 25 mm and 5 mm thick were sandwiched between steel strips as described in Example 11 which had been coated with the dispersion as described in Example 1 and dried at 85° C. for 30 minutes. The assemblies were then cured under an applied pressure of 700 kPa and their shear strengths were measured. The results are shown in Table 2, the figures being the means of three results.

TABLE 2

| Cure temperature/time | Shear strength (kN) at | |
|---|---|---|
| | 23° C. | 200° C. |
| 150° C./30 min. | 3.94 (15)* | 2.23 (100) |
| 180° C./30 min. | 3.77 (25) | 2.26 (100) |
| 180° C./45 min. | 3.58 (35) | 2.16 (100) |
| 180° C./60 min. | 3.36 (25) | 2.15 (100) |

*Figures in parentheses indicate percentage of the break that occurred in the brake lining instead of at the brake lining - metal interface.

EXAMPLE 13

Example 11 was repeated, using the dispersions described in Examples 4, 5, and 8 to 10. The joints were cured for 30 minutes at 180° C. under an applied pressure of 700 kPa, and their bond strengths in longitudinal shear were measured at 23° C. and at 200° C. The results are shown in Table 3, the figures being the mean of four results.

TABLE 3

| Product of Example | Shear strength (kN) at | |
|---|---|---|
| | 23° C. | 200° C. |
| 4 | 2.12 | 0.5 |
| 5 | 4.02 | 2.52 |
| 8 | 2.63 | 0.44 |
| 9 | 1.24 | 1.19 |
| 10 | 3.40 | 0.68 |

EXAMPLE 14

Example 12 was repeated, using the dispersion described in Example 5. The assemblies were cured for 30 minutes at 180° C. under an applied pressure of 700 kPa and the shear strengths were measured at room temperature and at 200° C. Both figures are the mean of three results Shear strength at 23° C.: 3.34 kN (70)
Shear strength at 200° C.: 2.08 kN (100)

The figures in parentheses indicate the percentage of the break that occurred in the brake lining instead of at the lining-metal interface.

What is claimed is:

1. A process for the preparation of aqueous dispersions which comprises
   (a) dissolving a solid thermoplastic polymeric material or a solid rubber in a phenol or mixture of phenols at a temperature of 30° to 120° C., under conditions such that the phenol or mixture of phenols is in a liquid state,
   (b) by adding at least one member selected from non-ionic surface active agents, anionic surface active agents, and protective colloids,
   (c) adjusting the resulting mixture to a pH above 7 by addition of a base,
   (d) adding aqueous formaldehyde solution, or a formaldehyde donor, to a molar ratio of phenol to formaldehyde within the range 1:1 to 1:3,
   (e) adding water if necessary, to bring the mixture to a water content of at least 20% by weight, calculated on the weight of the phenol, and
   (f) heating the mixture and allowing it to react to form a phenolic resole.

2. The process of claim 1 wherein the phenol is phenol itself, resorcinol, p-cresol, m-cresol, 2,6-xylenol, p-nonylphenol, p-tert.butylphenol, an isopropylphenol, bis(p-hydroxyphenyl)methane, or 2,2-bis(p-hydroxyphenyl)propane, a mixture of at least two of these phenols, or a mixture of any of these phenols and a methylolated derivative thereof.

3. The process of claim 1 wherein the thermoplastics polymeric material is poly(vinyl acetate), an ethylene-vinyl acetate copolymer, an acrylonitrile-butadiene-styrene copolymer, polystyrene, a polysulfone, a polycarbonate, a nylon polyamide, or an acetal of a poly(vinyl alcohol).

4. The process of claim 1 wherein the thermoplastics polymeric material has an average molecular weight above 10,000.

5. The process of claim 1 wherein the amount of the thermoplastics polymeric material or rubber is from 5% to 100% by weight calculated on the weight of the phenol.

6. The process of claim 1 wherein the surface active agent is anionic and is an alkali metal salt of any of the following: an aliphatic carboxylic acid of 12 to 18 carbon atoms, an alkylbenzenesulfonic acid, a naphthalenesulfonic acid, a sulfated ester of a long chain fatty acid, or a polyoxyethylene alkylsulfuric acid.

7. The process of claim 1 wherein the surface active agent is nonionic and is a polyoxyalkylated alkylphenol, a polyoxyalkylated alkylphenol novolak, a polyoxyalkylated fatty acid, a polyoxyalkylated resinic acid, a polyoxyalkylated long chain alcohol, or polyoxyalkylated castor oil.

8. The process of claim 1 wherein the protective colloid is a poly(vinyl alcohol), a partially hydrolysed poly(vinyl acetate), sodium carboxymethylcellulose, methylcellulose, gum acacia, guar gum, algin, carrageenan, gum tragacanth, or amylopectin.

9. The process of claim 1 wherein the mixture is heated at a temperature within the range 40° C. to 120° C. to form the phenolic resole.

10. A method of bonding surfaces together which comprises coating at least one surface with an aqueous dispersion prepared by a process as claimed in claim 1, allowing or causing the dispersion to dry, bringing the surfaces into contact, and heating the assembly to cure the phenolic resole contained in the dispersion.

* * * * *